Oct. 31, 1939. W. G. CALKINS ET AL 2,178,529
BEARING MANUFACTURE
Original Filed May 1, 1936 2 Sheets-Sheet 2
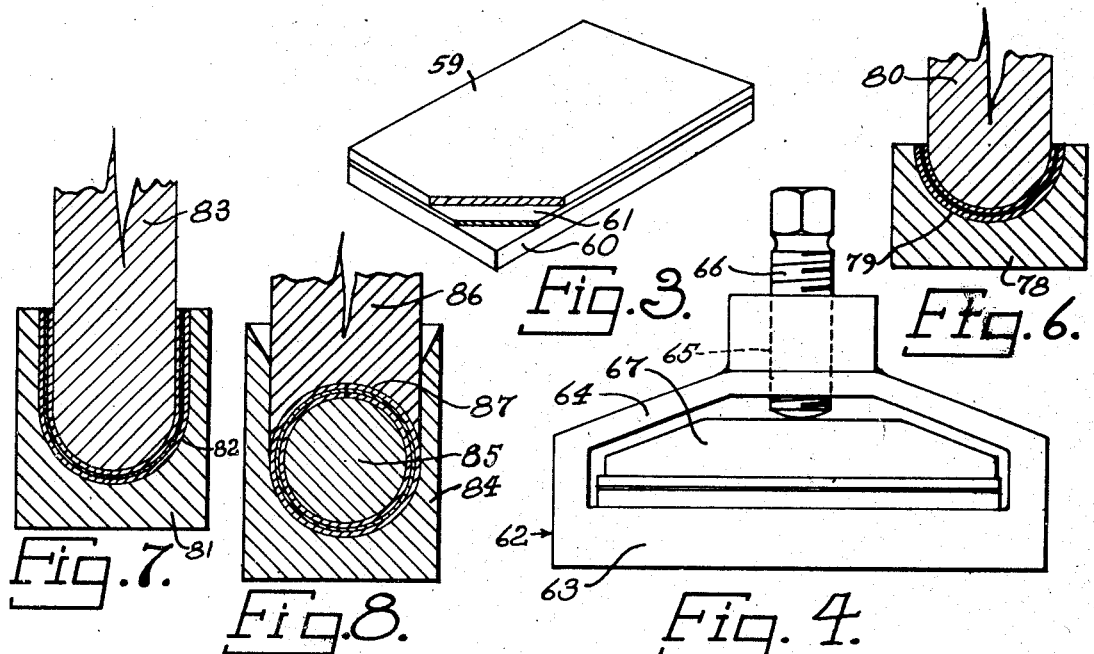
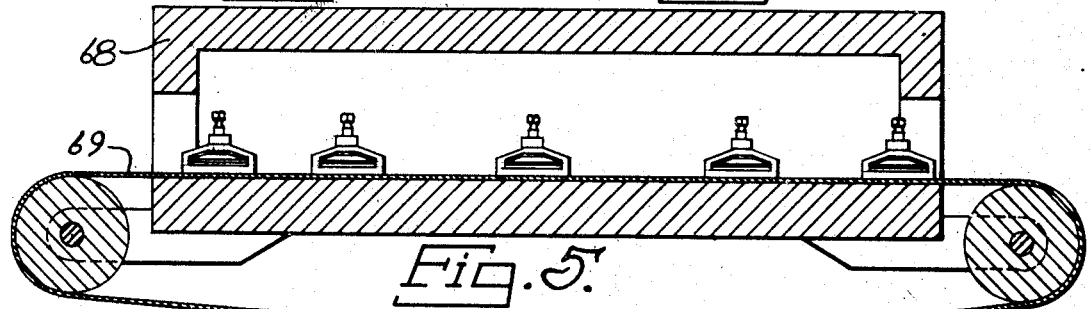
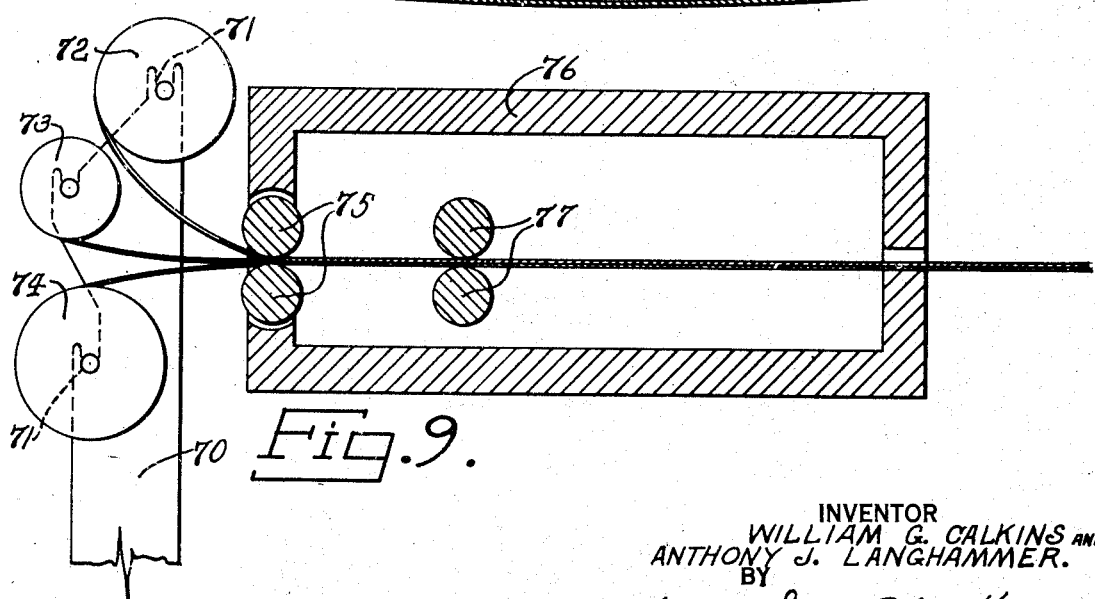
INVENTOR
WILLIAM G. CALKINS AND
ANTHONY J. LANGHAMMER.
BY
Harness, Dind Patee & Harris
ATTORNEY Patented Oct. 31, 1939

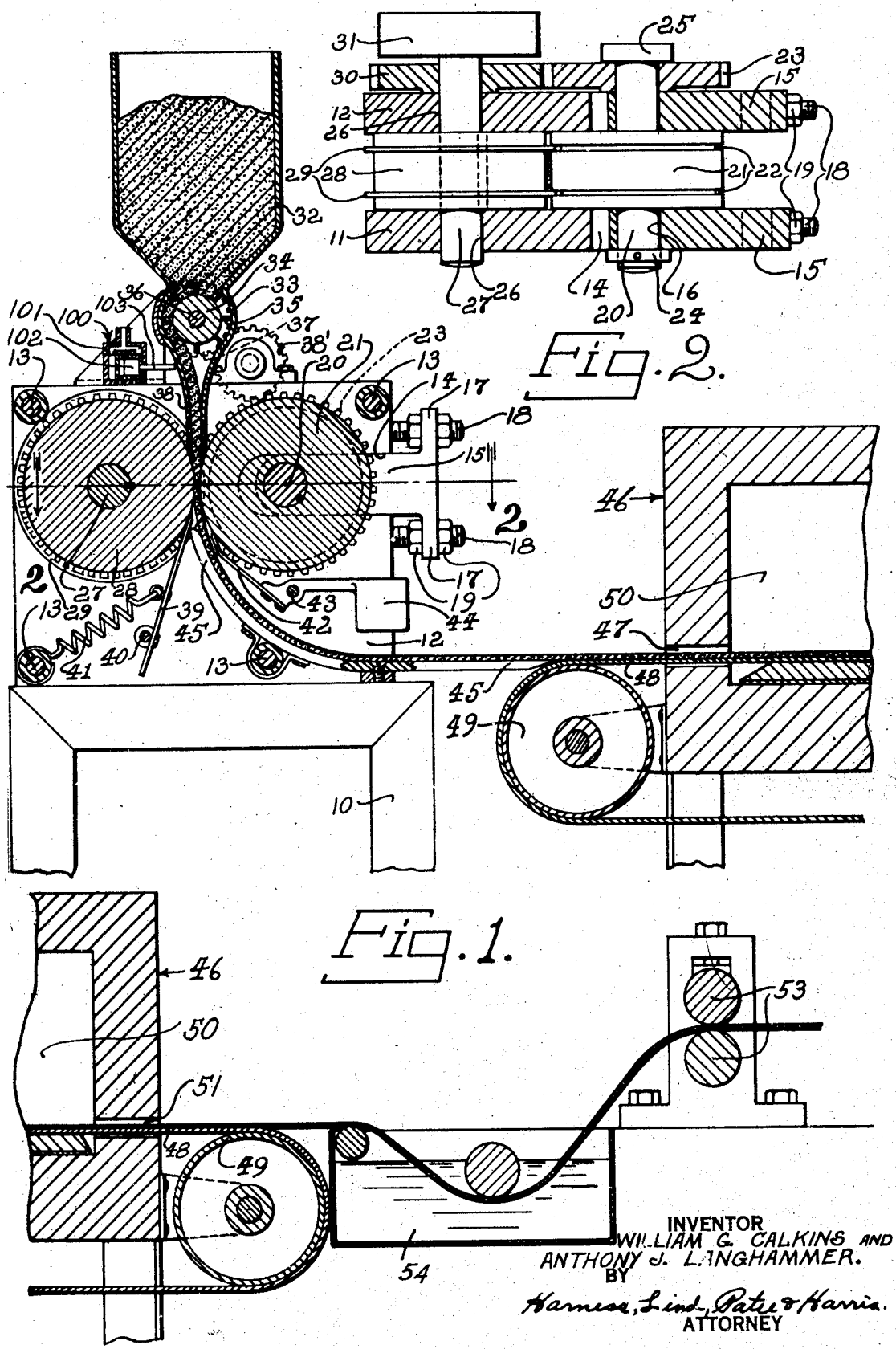

2,178,529

UNITED STATES PATENT OFFICE 2,178,529

BEARING MANUFACTURE

William G. Calkins and Anthony J. Langhammer, Detroit, Mich., assignors to Chrysler Corporation, Highland Park, Mich., a corporation of Delaware Application May 1, 1936, Serial No. 77,324
Renewed May 17, 1939

14 Claims. (Cl. 29—149.5)

This invention relates to improved bearing materials and to an improved method for making the same and for making bearing material including articles.

More particularly the invention pertains to improvements in bearings having porous metal bearing surfaces of the character which have a substantial lubricant absorbing capacity.

One of the main objects of the invention is to provide porous metal bearing material in the form of sheet-stock which may be employed in its flat shape or readily formed to a desired contour.

Another object of the invention is to provide sintered porous metal bearing material of sheet-like form having mixed particles of different powdered metals substantially integrally bonded together and which also includes solid lubricating material.

A further object of the invention is to provide an improved mixture of finely divided constituents of porous metal of this character that is particularly adapted for the formation of sheet-like briquettes which in their compressed, but unsintered state, are sufficiently flexible to accommodate substantial flexure during production and subsequent handling without fracture.

Another object of the invention is to provide an improved solid lubricating agent in porous metal forming powdered mixtures of this kind which enables sheet-like briquettes formed therefrom to be bent a substantial amount during handling without breaking the continuity of the briquette structure.

A still further object of the invention is to provide an improved finished and sintered sheet-like bearing material of this kind which may be deformed to a comparatively large variety of shapes and which is sufficiently flexible to withstand repeated flexure without failure.

Another object of the invention is to provide an improved composite bearing member which has porous metal surface providing elements and a reinforcing backing rigidly secured thereto.

A further object of the invention is to provide an improved porous metal bearing material which will bond directly to reinforcing backings or which may be bonded thereto by soldering or brazing.

Still further objects of the invention are to provide improved methods for manufacturing sheet-like porous metal bearing material and to provide a continuous process of this character by which comparatively long strips of such material can be made in a continuous manner.

A still further object of the invention is to provide an improved method for continuously applying elongated strips of sheet-like porous metal bearing material to correspondingly elongated strips of reinforcing backing metal.

An illustrative embodiment of the invention is shown in the accompanying drawings, in which:

Fig. 1 is a fragmentary, interrupted elevational view showing porous metal forming apparatus embodying the invention, partly in section and with parts removed to disclose the underlying structure.

Fig. 2 is a horizontal sectional view taken on the line 2—2 of Fig. 1.

Fig. 3 is a perspective view showing a sheet of our improved porous metal bearing material in superimposed relation on a reinforcing backing and having a layer of bonding alloy therebetween.

Fig. 4 is an illustrational side elevational view showing the superimposed backing and bearing material layers of Fig. 3 in a clamped relation suitable for the application of heat to effect a bond between the layers.

Fig. 5 is a diagrammatic longitudinal sectional view of a furnace for heating the backing and bearing material illustrated in Fig. 4 to effect a bond therebetween.

Fig. 6 is a fragmentary, vertical, sectional view of die forming apparatus by which a finished blank comprising a backing and a layer of porous metal bearing material may be brought to semi-cylindrical shape.

Fig. 7 is a fragmentary, sectional view of die forming apparatus for performing the initial forming operation upon a bearing blank preparatory to bringing it to final cylindrical shape.

Fig. 8 is a fragmentary sectional view of die forming apparatus for completing the cylindrical formation which the apparatus shown in Fig. 7 is adapted to commence.

Fig. 9 is a longitudinal sectional view of a furnace showing apparatus therein embodying a modified form of the invention for effecting a continuous bonding together of elongated ribbons of porous metal bearing material and sheet backing material.

In the form of the invention illustrated in the drawings, our improved porous metal forming method may be performed with apparatus which includes a support 10 on which is mounted a frame structure comprising spaced side members 11 and 12 which are secured together and held in fixed spaced relation by transverse bars 13.

Each side member 11 and 12 is provided with a slot 14 extending inwardly from its right vertical edge, as viewed in Fig. 1, in which is slidably mounted a block 15 having a bore 16 formed in its inner end. Each block 15 has outwardly extending flanges 17 on its external end provided with apertures through which threaded studs 18, rigidly mounted in the frame side members 11 and 12, respectively, extend. Threaded on each stem 18 is a pair of nuts 19 between which the flanges 17 of the block 15 are disposed. The nuts 19 may be adjusted to selectively position the blocks 15 in their respective slots 14 and to maintain the blocks against unintended movement.

Journalled in the bores 16 of the slidable blocks 15 is a shaft 20 which extends transversely of the frame structure and on the intermediate portion of which is rigidly mounted a roller 21 having spaced grooves 22 formed in its periphery. A gear 23 is also non-rotatably fixed to the shaft 20 and disposed adjacent the side member 12 of the frame structure. The shaft 20 is held against axial movement relative to the slide blocks 15 by collars 24 and 25 which are fixed on its respectively opposite ends and disposed externally of the frame structure, the collar 24 being located adjacent the slide block 15 of one side frame member and the collar 25 being disposed adjacent the gear 23.

The side members 11 and 12 of the frame member are provided with registering bores 26 in which are journalled a transversely extending shaft 27 having a roller 28 non-rotatably mounted on its intermediate portion and disposed between the sides 11 and 12 of the frame. The roller 28 has external ribs 29 on its periphery which fit into the grooves 22 of the roller 21 in order to provide a passage between the peripheries of the rollers 21 and 28 having sharply defined edge extremities. Non-rotatably mounted on the shaft 27 is a gear 30 having teeth thereon meshed with the teeth of the gear 23. One end of the shaft 27 is provided with a driving member, diagrammatically illustrated at 31, which may comprise a gear, pulley or other suitable means by which the shaft 27 and roller 28 thereon may be rotated by a suitable motor or other prime mover. The peripheries of the rollers 21 and 28 may be adjustably positioned with respect to each other by manipulation of the nuts 19 on the threaded stems 18 which are adapted to shift the slidable blocks 15 inwardly and outwardly with respect to the slots of the side members 11 and 12 of the frame in order to bring the peripheries of the rollers 21 and 28 closer together or further apart as desired. In this manner, the thickness of the article compressed between the rollers may be conveniently predetermined. The diameters of the rolls 21 and 28, as well as their spaced relationship, are preferably predetermined to facilitate the formation of briquettes of different thicknesses. It is found that more satisfactory results are obtained by reducing the diameters of the rolls as the thickness of the strip formed therebetween is decreased, and increasing the diameters of the rolls as the thickness of such strip is increased.

Mounted on the frame structure of the porous metal forming apparatus shown in Fig. 1 is a hopper 32 having an intermediate portion 33 of somewhat cylindrical cross-section in which is mounted a dispensing device 34 having radially extending vanes 35. The dispensing device 34 is non-rotatably mounted on a shaft 36 journalled in the side walls of the intermediate portion 33 of the hopper and this shaft is drivingly connected by gears 37 and 38' with the gear 23 by which the roller 21 is driven in timed relation with respect to the roller 28 and gear 30. During operation of the rollers the dispensing device 34 is rotated in timed relationship therewith so as to discharge measured quantities of the contents of the hopper from the latter at a rate proportional to the speed of operation of the rollers. The hopper 32 has a downwardly extending tapered discharge spout 38 which is adapted to direct the material discharged from the hopper into the space between the rollers 21 and 28 and between the ribs 29 of the roller 28. Mounted on the frame structure of the forming apparatus is a vibrator, generally designated by the numeral 100 in Fig. 1, by which the discharge spout 38 and walls of the hopper 32 can be vibrated to feed powdered material to the rolls. This vibrator includes an air cylinder 101, piston 102, and piston rod 103 engaging the discharge spout 38 and suitable valve mechanism (not shown) by which vibratory movement of the piston is controlled. A scraper 39 is pivotally mounted at 40 on the side member 12 of the frame structure and is provided at its upper end with a knife edge which is yieldably held in contact with the periphery of the roller 28 by a coil spring 41, as illustrated in Fig. 1.

A similar scraper 42 is pivotally mounted at 43 on the side member 12 of the frame structure and yieldably held in contact with the periphery of the roller 21, and particularly the portion thereof between the groove 22 of the roller 21 by a counterweight 44 which normally tends to rotate the scraper 42 in a clockwise direction as viewed in Fig. 1.

Disposed between the scrapers 39 and 42 is a support 45 having an arcuately curved end portion projecting to within close proximity of the peripheries of the rollers 21 and 28 which is adapted to receive the ribbon of sheet-like porous bearing material compressed between the rollers 21 and 28 and to guide the movement thereof in a curvilinear course of relatively large curvature as the compressed ribbon is discharged from the pressure-applying apparatus. The opposite end portion of the support 45 is substantially horizontal and it is constructed and arranged to direct the ribbon of compressed constituents of the porous metal toward the inlet end of a furnace 46, hereinafter more specifically described.

Any desired combination of constituents of porous metals may be placed in the hopper 32 and fed therefrom by the dispensing apparatus 34 to the rollers 21 and 28 by which the material, which is usually in a very finely divided state, is compressed to the form of a sheet-like briquette of any desired thickness, the length of the briquette being determined by the amount of the powdered mixture supplied to the hopper 32 and the thickness thereof being predetermined by the size and adjustment of the rollers 21 and 28 in the foregoing manner.

While a large variety of mixtures of powdered metals and other ingredients may be used, it has been found that the following compositions produce briquettes which, in their unsintered state, will accommodate considerable deflection in order to facilitate continuous removal of the ribbon of compressed powdered materials from the rollers to the furnace in which it is later sintered.

No. 1

| | Percent by weight |
|---|---|
| Powdered lead | 10 |
| Powdered tin | 10 |
| Powdered graphite | 1½ |
| Powdered boric acid | 1½ |
| Powdered copper | 77 |

No. 2

| | Percent by weight |
|---|---|
| Powdered tin | 10 |
| Powdered boric acid | ½ |
| Exfoliated mica | 1½ |
| Powdered copper | 88 |

No. 3

| | Percent by weight |
|---|---|
| Powdered copper | 20 |
| Powdered graphite | 1½ |
| Powdered boric acid | 1 |
| Powdered iron | 77.5 |

The percentages of the materials used in the foregoing compositions may be varied within substantially wide limits, the particular proportions recited being given merely as examples of compositions which, it has been found, may be readily compressed into sheet-like briquettes in a continuous briquetting process of the foregoing type. The graphite in compositions Nos. 1 and 3 and the mica in composition No. 2 serve as a lubricant during the compression operation and also remain in the finished product to enhance the lubricating properties thereof. Any suitable solid lubricating material may be used in place of mica and graphite and in some mixtures liquid lubricant such as ordinary lubricating oil may be employed. Mica and graphite have, however, been found to impart a desirable high degree of flexibility to the compressed briquette, which serves prior to sintering to guard against fracture of the ribbon-like briquette discharged from the rollers during handling thereof.

The boric acid also serves as a lubricant during the compressing operation and it has a further purpose the fluxing of the composition during the sintering operation. Other combined fluxing and lubricating agents, such as stearic acid, polmitic acid and salicylic acid, may be used for this purpose.

The terminology "bearing material" and "porous bearing metal" appearing in the specification and claims is used in its broad sense and should be construed to include frictional, such as that employed in lining brakes and clutches, as well as anti-frictional materials. In many frictional applications, porous metal formed from powdered mixtures of the foregoing compositions are satisfactory, particularly when the lubricant impregnating operation is omitted.

Sheet-like porous metal, particularly adapted for applications where a relatively high coefficient of friction is desired, such as in clutch and brake linings, can be formed in the foregoing manner from a mixture of powdered constituents having the following composition:

| | Percent by weight |
|---|---|
| Copper | 79 |
| Tin | 9 |
| Lead | 5 |
| Graphite | 1 |
| Asbestos | 5 |
| Boric acid | 1 |

The asbestos of the above composition which serves to increase the coefficient of friction of the resulting product can be substituted for by aluminum oxide, magnesium oxide, silica or talc in substantially the same proportion.

The furnace 46 is disposed adjacent the discharge end of the support 45 and it has an inlet opening 47 which registers with the latter. Disposed in substantial alignment with the upper surface of the support 45 is a conveyor belt 48 which is movably supported on spaced rollers 49 mounted on the opposite ends of the furnace 46. The upper side of the conveyor 48 extends through the interior 50 of the furnace 46 and through an outlet opening 51 which registers with the inlet opening 47. As the continuous sheet-like briquette leaves the discharge end of the support 45, it is deposited upon the belt 48 of the conveyor by which it is gradually drawn through the interior of the furnace 46 which preferably has a non-oxidizing or reducing atmosphere. A suitable atmosphere may be provided by supplying either hydrogen or illuminating gas of a reducing character to the interior of the furnace. The furnace is preferably maintained at a temperature slightly above the melting point of one of the powdered metal constituents of the mixture of which the briquette is formed and below the melting point of the other metal. If more than two metals are employed in the mixture then the sintering temperature may be above the melting point of two of the metal constituents thereof but below the melting point of the other. The particular temperature is, of course, predetermined by the character of the constituent of the powdered mixture of which the briquette is formed. The conveyor belt 48 is preferably driven by driving mechanism (not shown) which may be operatively connected with one of the pulleys 49.

After the ribbon-like briquette has been sintered, it may be deflected while unsupported, as illustrated in the lower portion of Fig. 1 in order to submerge it in an oil bath 54 so as to impregnate the porous metal structure with a suitable lubricant. This lubricant impregnating step may, if desired, be omitted completely or delayed until after the bearing material has been made up into final form.

After the lubricant impregnating operation or, in the event this step is not employed, after the sintering operating, the ribbon-like strip is passed continuously through a pair of sizing rolls 53 by which it may be brought to a desired thickness for use in applications where slight variations in thickness are not permissible.

The sintered ribbon of porous metal may then be wound into a roll upon a reel, (not shown), or cut into desired lengths for future use. The sheet-like porous metal may be used, in some applications, in its relatively flat state or it may be formed to any desired curvilinear contour and employed for bearing surface purposes.

In Figs. 3 to 9, inclusive, is illustrated one application of our improved porous metal sheeting which comprises the formation of reinforced bearing members. Such bearing members may be conveniently fabricated by cutting the ribbon of porous metal into pieces 59 of desired lengths and placing them upon a piece of sheet metal 60 of corresponding size as illustrated in Fig. 3. The porous metal may, in many instances, be bonded directly to the sheet metal which preferably comprises sheet steel or sheet brass. In some instances it is desirable to solder or braze the porous metal layer to the reinforcing backing. This may be conveniently accomplished by placing between the two layers an intermediate film 61 of powdered solder or brazing compound or sheet foil 61 comprising such compounds and a suitable flux. The bonding metal may also be deposited on the sheet metal or porous metal by electrical plating or deposition. The superimposed layers of reinforcing backing material and porous metal either with or without an intermediate film of soldering or brazing alloy may then be placed under compression in a clamping device generally designated by the numeral 62 and shown in Fig. 4. The clamping device 62 includes a base plate 63 and a spaced bail-like structure 64 having a threaded opening 65 in its central portion in which a set screw 66 is threaded.

Disposed between the lower end of the set screw 66 and the upper layer of the structure being clamped is a block 67 which is firmly held by the screw 66 and clamped in clamping engagement upon the superimposed layers of reinforcing and porous metal. The superimposed layers 59 and 60 are then firmly bonded together by the application of heat thereto while they are so held under compression. This may be conveniently accomplished by passing them, while held in their clamps, through a furnace 68 which preferably had a reducing or nonoxidizing atmosphere. A plurality of clamps containing layers of reinforcing material and porous metals may be successively passed through the furnace 68 by supporting the clamps in which they are disposed through the furnace on an endless conveyor 69, in the manner illustrated in Fig. 5.

Successively adjacent portions of elongated ribbons of porous metal may be continuously bonded to corespondingly elongated ribbons of sheet metal backing material by the apparatus illustrated in Fig. 9. This aparatus includes a rack, diagrammatically illustrated in Fig. 9, which comprises a pair of spaced side members 70, only one of which is shown. The side members 70 are provided with registering notches 71 for rotatably supporting reels 72, 73 and 74 comprising ribbons of porous metal, brazing or soldering foil and reinforcing sheet metal respectively. The ribbons from the reels 72, 73 and 74 are fed in superimposed relation by a pair of mechanically driven rolls 75 through a furnace 76 which is heated to a temperature sufficiently high to effect a bond between the reinforcing backing material and the porous metal. The latter layers of ribbon-like material are compressed together between pressure rolls 77 which are located within the furnace 76 and preferably far enough from the inlet end thereof to allow the material to be heated before pressure is applied. There may be provided as many pairs of pressure rolls 77 as is required to subject the ribbons of sheet metal backing material and porous metal to the required extent of compression.

This bonding is preferably conducted in a non-oxidizing or reducing atmosphere by supplying either hydrogen or illuminating gas of a reducing character to the interior of the furnace 76. When it is desired to secure the porous metal ribbons to the sheet metal reinforcing ribbon directly, the reel of soldering or brazing material 73 may be omitted. In this case it may be found to be necessary to raise the temperature in the furnace 76 substantially above the temperature required for a brazing or soldering operation.

The composite strip of reinforcing and porous metal may be then rewound on a reel and stored for later use. It may be conveniently cut into lengths of desired dimensions and employed in a flat state or in any desired curvilinear contour.

In Fig. 6 is diagrammatically illustrated die forming apparatus by which a composite piece of reinforcing sheet metal and sheet porous metal may be conveniently brought to semi-cylindrical shape. This apparatus includes a die part 78 having a cavity 79 therein to which a bearing member blank formed in accordance with the foregoing method may be pressed to semi-cylindrical shape by a ram or die 80.

In Figs. 7 and 8 is illustrated the formation of a cylindrical bearing member from a piece of composite stock produced in accordance with the foregoing method. Initial operation may be conducted in a die part 81 having a cavity 82 therein of U-shaped cross-section into which the bearing member blank may be forced by a die part 83, as illustrated in Fig. 7. The preformed blank may then be transferred to a die, of the character illustrated at 84 in Fig. 8 wherein the parallel side portions of the preformed blank may be conveniently wrapped around the mandrel 85 by a plunger or die part 86 having a substantially semi-cylindrical cavity 87 in its end portion.

In the formation of bearing members of this character, the porous metal layer is preferably disposed internally, but if desired, this condition may be reversed to bring the porous metal layer to the exterior of either a cylindrical or semi-cylindrical bearing member.

Bearings made in accordance with our invention have a comparatively large lubricant absorbing capacity and in many installations may at their place of manufacture be provided with sufficient lubricant to last throughout their normal life. When reinforcing backings are employed, the resulting bearing member is materially strengthened and the porous metal layer thereof is protected from breakage both in service and in shipment. If desired, the seams of the cylindrical bearing shown in Fig. 8 may be welded or otherwise fixed together. Both cylindrical and semi-cylindrical bearings of the above types can be accurately brought to a desired internal diameter by a broaching operation in the same manner as conventional cast bearings are finished.

The foregoing processes for the manufacture of porous metal bearing material and for the manufacture of reinforced porous metal bearings are well suited for high production requirement and the porous bearing metal may be manufactured and conveniently shipped to substantially any distant point for later fabrication into bearing members.

Although but several specific embodiments of the invention are herein set forth, it is recognized that various changes of the materials used and operations involved may be made without departing from the spirit and scope of the invention.

We claim:

1. The method of manufacturing sheet porous metal which comprises continuously feeding a charge of a mixture including powdered metals having different melting points directly between opposed arcuate surfaces of a pair of pressure rolls to compress said charge uniformly from respectively opposite sides into sheet-like briquette form, and then heating the latter to a sintering temperature in a furnace having a non-oxidizing atmosphere.

2. The method of manufacturing sheet porous metal which comprises continuously feeding a ribbon-like charge of a mixture including powdered metals having different melting points directly between opposed arcuate surfaces of a pair of pressure rolls during rotation of the latter and at a rate proportionate to the speed of operation of said rolls so as to compress said charge substantially identically from respectively opposite sides thereof into sheet-like briquette form, and then heating the latter to a sintering temperature in a furnace having a non-oxidizing atmosphere.

3. The method of manufacturing sheet porous metal which comprises continuously feeding a mixture comprising finely divided particles of different metals directly between a pair of drivingly rotated pressure rolls, so as to compress said mixture uniformly from respectively opposite sides into sheet-like briquette form, directing the latter continuously as it is discharged from said rolls toward the inlet end of a furnace, moving said compressed sheet-like briquette continuously through said furnace while subjecting it to a sintering temperature therein, and discharging the sintered product while heated into an oil bath to saturate the pores thereof with oil.

4. The method of manufacturing sheet porous metal which comprises continuously feeding a charge of a mixture including powdered lead, tin, graphite and copper and a fluxing agent directly through and between mutually drivingly rotated pressure rolls so as to compress said charge uniformly from respectively opposite directions into sheet-like briquette form, and then heating the latter to a sintering temperature in a reducing atmosphere.

5. The method of manufacturing sheet porous metal which comprises feeding a charge of a mixture including powdered tin and copper and exfoliated mica and a fluxing agent having lubricating properties directly through and between mutually drivingly rotated pressure rolls so as to subject said charge to substantially the same unit pressure from respectively opposite sides and to compress the same to sheet-like briquette form, and then heating the latter to a sintering temperature in a reducing atmosphere.

6. The method of making a bearing member which comprises rigidly bonding a substantially flat sheet-like piece of compressed and sintered porous metal of relatively small thickness to a sheet metal backing of substantially flat contour, and then deforming the resulting composite structure to a desired shape.

7. The method of making a bearing member which comprises rigidly bonding a substantially flat sheet-like piece of compressed and sintered porous metal of relatively small thickness to a sheet metal backing of substantially flat contour, and then bringing the resulting structure to tubular shape with said porous metal disposed internally.

8. The method of making a bearing member which comprises rigidly bonding a substantially flat sheet-like piece of compressed and sintered porous metal of relatively small thickness to a sheet metal backing of substantially flat contour, and then forming the resulting structure to substantially semi-cylindrical shape between dies with the porous metal arranged internally of the resulting semi-cylindrical structure.

9. The method of making bearing members which comprises forming an elongated sheet of porous metal, disposing said sheet of porous metal in superimposed relation on a correspondingly elongated strip of reinforcing backing metal, subjecting said strips to heat and pressure to bond the same together, cutting the resulting composite strips of porous and reinforcing metals into blanks having a surface area and dimensions corresponding to the surface area and dimensions of a desired bearing member, and bringing said composite strip to a desired curvilinear shape.

10. The method of making bearing members which comprises forming an elongated strip of sheet porous metal, forming a correspondingly elongated strip of reinforcing sheet metal, disposing said strips in superimposed relation with a bonding alloy interposed therebetween, subjecting said strips to heat and pressure to bond the same together, cutting the resulting composite strips of porous and reinforcing metals into blanks having a surface area and dimensions corresponding to the surface area and dimensions of a desired bearing member, and bringing said composite strip to a desired curvilinear shape.

11. The method of making bearing members which comprises compressing a mixture including different powdered metals and a flux having lubricating properties from respectively opposite sides with substantially equal unit pressure by passing the same directly between pressure rolls to form a porous sheet-like elongated briquette, sintering said briquette in a non-oxidizing atmosphere, disposing the resulting sheet-like strip of porous metal on an elongated reinforcing strip of sheet metal, bonding said strips together, cutting the resulting composite strip into blanks having a substantially flat surface area and dimensions corresponding to the surface area and dimensions of a desired bearing member, and bringing said composite strip to a desired curvilinear shape with said porous metal strip disposed internally.

12. The method of making sheet-like porous metal articles which comprises mixing together powdered lead, powdered tin, exfoliated mica, a preponderance of powdered copper and a fluxing agent having lubricating properties; compressing said mixture to a briquette of sheet-like contour, and sintering said briquette in a non-oxidizing atmosphere.

13. The method of making an article having a surface comprising bearing material which includes the steps of forming from powdered material an elongated ribbon of porous metal, disposing said ribbon of porous metal adjacent a surface of a correspondingly elongated strip of reinforcing backing metal, subjecting the resulting assembly to heat and pressure to bond said ribbon and strip together, cutting the resulting composite assembly into blanks, and bringing said cut portions of said composite assembly to a desired contour.

14. The method of manufacturing sheet porous metal which comprises feeding a charge including powdered metal directly between a pair of drivingly rotated pressure rolls, so as to compress said charge uniformly from respectively opposite sides into sheet-like briquette form, and then heating the latter to a sintering temperature in a furnace having a non-oxidizing atmosphere.

WILLIAM G. CALKINS.
ANTHONY J. LANGHAMMER.